United States Patent
Zeng et al.

(10) Patent No.: US 10,565,075 B2
(45) Date of Patent: Feb. 18, 2020

(54) STORAGE DEVICE AND BLOCK STORAGE METHOD BASED ON THE STORAGE DEVICE

(71) Applicant: Hangzhou Hikvision Digital Technology Co., Ltd., Hangzhou (CN)

(72) Inventors: Fanli Zeng, Hangzhou (CN); Peng Lin, Hangzhou (CN); Qiqian Lin, Hangzhou (CN); Weichun Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 147 days.

(21) Appl. No.: 15/578,474

(22) PCT Filed: Dec. 16, 2015

(86) PCT No.: PCT/CN2015/097582
§ 371 (c)(1),
(2) Date: Nov. 30, 2017

(87) PCT Pub. No.: WO2016/192375
PCT Pub. Date: Dec. 8, 2016

(65) Prior Publication Data
US 2018/0173598 A1 Jun. 21, 2018

(30) Foreign Application Priority Data
Jun. 3, 2015 (CN) .............. 2015 1 299026

(51) Int. Cl.
*G06F 11/00* (2006.01)
*G06F 11/20* (2006.01)
(Continued)

(52) U.S. Cl.
CPC ......... *G06F 11/2094* (2013.01); *G06F 3/061* (2013.01); *G06F 3/064* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,235,601 A | * | 8/1993 | Stallmo | G06F 11/1435 714/6.21 |
| 6,502,205 B1 | * | 12/2002 | Yanai | G06F 3/0601 714/6.32 |

(Continued)

FOREIGN PATENT DOCUMENTS

| | | |
|---|---|---|
| CN | 101324898 A | 12/2008 |
| CN | 101814044 A | 8/2010 |
| WO | 2008106686 A1 | 9/2008 |

OTHER PUBLICATIONS

International Search Report for PCT/CN2015/097582 dated Mar. 15, 2016 (6 pages total including English translation).

(Continued)

*Primary Examiner* — Amine Riad
(74) *Attorney, Agent, or Firm* — Shumaker, Loop & Kendrick, LLP (57) ABSTRACT

The present application discloses a storage device and a block storage method based on the storage device, wherein disk space of the storage device includes a data area having a plurality of end-to-end adjacent data block units, each of which includes a metadata block and a data block adjacent to each other; wherein the data block with a first preset capacity is configured to store target data, and the metadata block with a second preset capacity is configured to store information of the target data. With the storage device, metadata is stored in a distributed manner, wherein each of the metadata blocks and the data blocks are stored as a whole. The address offset of updating metadata after writing data is thus reduced, and the metadata update efficiency, as well as the overall storage performance of the storage device
(Continued)

are improved. In addition, with the metadata stored in this distributed manner, the probability of data unavailability due to continuous damage of a plurality of metadata blocks is greatly reduced, and the defects in the prior art that the intact data blocks cannot store data normally due to continuous damage of a plurality of metadata is overcome.

9 Claims, 3 Drawing Sheets (51) Int. Cl.
*G06F 12/02* (2006.01)
*G06F 3/06* (2006.01)

(52) U.S. Cl.
CPC .......... *G06F 3/0619* (2013.01); *G06F 3/0644* (2013.01); *G06F 3/0673* (2013.01); *G06F 12/02* (2013.01); *G06F 2201/805* (2013.01); *G06F 2201/82* (2013.01)

(56) References Cited

U.S. PATENT DOCUMENTS

| | | | | |
|---|---|---|---|---|
| 6,732,124 B1* | 5/2004 | Koseki | ............... | G06F 11/1435 |
| 6,742,137 B1* | 5/2004 | Frey, Jr. | ............... | G06F 11/1076 |
| | | | | 714/6.22 |
| 6,778,558 B2* | 8/2004 | Balachandran | ....... | H04L 1/0003 |
| | | | | 370/216 |
| 6,928,521 B1* | 8/2005 | Burton | ............... | G06F 12/0866 |
| | | | | 711/114 |
| 7,032,125 B2* | 4/2006 | Holt | ............... | G06F 3/0601 |
| | | | | 711/114 |
| 7,694,191 B1* | 4/2010 | Bono | ............... | G06F 11/004 |
| | | | | 714/48 |
| 7,873,619 B1* | 1/2011 | Faibish | ............... | G06F 16/13 |
| | | | | 707/705 |
| 8,037,345 B1* | 10/2011 | Iyer | ............... | G06F 11/1004 |
| | | | | 714/6.12 |
| 8,285,758 B1* | 10/2012 | Bono | ............... | G06F 16/119 |
| | | | | 707/822 |
| 8,297,520 B1* | 10/2012 | Wakerly | ............... | G06Q 20/352 |
| | | | | 235/492 |
| 8,495,010 B2* | 7/2013 | Moore | ............... | G06F 16/184 |
| | | | | 707/610 |
| 8,762,661 B2* | 6/2014 | Ng | ............... | G06F 3/0617 |
| | | | | 711/154 |
| 9,432,433 B2* | 8/2016 | Luby | ............... | H04L 65/4084 |
| 9,990,156 B1* | 6/2018 | Kandamuthan | ..... | G06F 11/1453 |
| 2003/0204670 A1* | 10/2003 | Holt | ............... | G06F 3/0601 |
| | | | | 711/112 |
| 2003/0204970 A1* | 11/2003 | Liu | ............... | A43B 1/0081 |
| | | | | 36/50.1 |
| 2007/0124341 A1* | 5/2007 | Lango | ............... | G06F 16/10 |
| 2008/0215834 A1 | 9/2008 | Dumitru et al. | | |
| 2008/0228992 A1* | 9/2008 | Dumitru | ............... | G06F 3/0613 |
| | | | | 711/100 |
| 2012/0005450 A1* | 1/2012 | Bomma | ............... | G06F 3/061 |
| | | | | 711/171 |
| 2012/0005456 A1* | 1/2012 | Berkley | ............... | G06N 10/00 |
| | | | | 712/1 |
| 2012/0150930 A1 | 6/2012 | Jin et al. | | |
| 2012/0311201 A1* | 12/2012 | Amann | ............... | G06F 13/20 |
| | | | | 710/52 |
| 2014/0359382 A1* | 12/2014 | Choi | ............... | G06F 11/2094 |
| | | | | 714/710 |
| 2017/0300424 A1* | 10/2017 | Beaverson | ......... | G06F 12/0246 |
| 2018/0074703 A1* | 3/2018 | Dawirs | ............... | G06F 3/061 |
| 2019/0042369 A1* | 2/2019 | Deutsch | ............... | G06F 11/1435 |

OTHER PUBLICATIONS

Office Action for EP Patent App. No. 15894018.9 dated Nov. 20, 2018 (9 pages).

* cited by examiner

STORAGE DEVICE AND BLOCK STORAGE METHOD BASED ON THE STORAGE DEVICE

The present application claims the priority to Chinese patent application No. 201510299026.5, filed with the State Intellectual Property Office of People's Republic of China on Jun. 3, 2015 and entitled "STORAGE DEVICE AND BLOCK STORAGE METHOD BASED ON THE STORAGE DEVICE", which is incorporated herein by reference in its entirety.

TECHNICAL FIELD

The application relates to the technical field of data storage, in particular to a storage device, and also relates to a block storage method based on the storage device.

BACKGROUND

For data characteristics of the monitoring of storage, achieving structured management of the monitoring of storage by using underlying data blocks as basic storage units has become the direction of development of the industry. Block storage divides the space of storage device into blocks, wherein some of the blocks, referred to as metadata blocks, are used to store information of data, and others, referred to as data blocks, are used to store the data itself.

At present, a storage device is generally divided into regions, one of which may be used for centralized storage of all metadata, and others may be used for centralized storage of all data. Such a method offers convenience for management. However, the shortcomings of this method may include: the offset between a metadata block and a data block is larger, and thus an increased seek time is required to update the metadata after data have been written into data blocks; in addition, the centralized storage of metadata may easily cause continuous damage to the metadata, as a result, intact data blocks may not be able to store data normally due to such damage of the metadata. In order to enhance the reliability, additional resources have to be added to provide data protection.

SUMMARY

The technical problems to be solved by the present application are: the offset between a metadata block and a data block is larger when the block storage method for storage device in the prior art is used, and an increased seek time is required to update the metadata after data have been written into data blocks; in addition, the centralized storage of metadata may easily cause continuous damage to the metadata, as a result, the intact data blocks may not be able to store data normally due to such damage of the metadata.

In order to solve the above technical problems, the present application provides a storage device and a block storage method based on the storage device, which may improve storage performance while greatly reducing the probability of data unavailability due to the continuous damage of a plurality of metadata areas.

According to one aspect of the application, a storage device is provided, wherein disk space of the storage device includes a data area having a plurality of end-to-end adjacent data block units. Each data block units includes a metadata block and a data blocks adjacent to each other; wherein the data block with a first preset capacity is configured to store target data, and the metadata block with a second preset capacity is configured to store data information of the target data.

In a specific implementation of the present application, the disk space of the storage device further includes a control block having a control block header and a block bitmap; wherein the control block header is configured to store the number of the data block units, the first preset capacity and the second preset capacity; and the block bitmap is configured to store status information of usage status of each data block unit.

In a specific implementation of the present application, the head address of the control block is the same to that of the disk space, and the control block is adjacent to the first data block unit in the data area.

In a specific implementation of the present application, the disk space of the storage device further includes a redundant control block configured to be a redundant backup of the control block.

In a specific implementation of the present application, the tail address of the redundant control block is the same to that of the disk space.

According to another aspect of the present application, there is provided a block storage method based on the above storage device. The method includes:

receiving a data storage instruction for data to be stored;

determining a target data block unit in a data area of the storage device, wherein the storage device has been formatted, and the disk space of the formatted storage device includes a data area having a plurality of end-to-end adjacent data block units, each of which includes a metadata block and a data block adjacent to each other; wherein the data block with a first preset capacity is configured to store target data, and the metadata block with a second preset capacity is configured to store data information of the target data; and storing the data to be stored into the target data block unit.

According to another aspect of the present application, there is provided a block storage method based on the above storage device. The method includes:

formatting the storage device so that the disk space of the formatted storage device includes a data area having a plurality of end-to-end adjacent data block units, each of which includes a metadata block and a data block adjacent to each other; wherein the data block with a first preset capacity is configured to store target data, and the metadata block with a second preset capacity is configured to store data information of the target data;

determining a target data block unit in the data area; and storing data to be stored to the target data block unit.

In a specific implementation of the present application, formatting the storage device further makes the disk space of the formatted storage device include a control block having a control block header, a block bitmap and a redundant control block configured to be a redundant backup of the control block; wherein the control block header is configured to store the number of the data block units, the first preset capacity and the second preset capacity; the block bitmap is configured to store status information of usage status of each data block unit.

In a specific implementation of the present application, determining a target data block unit in the data area includes:

determining whether a linked list of not-full filled blocks in the memory is not null;

determining, in response to the determination that the linked list of not-full filled blocks is not null, a minimum data block unit according to the linked list of not-full filled blocks, and determining the minimum data block unit as the target data block unit.

In a specific implementation of the present application, determining a target data block unit in the data area further includes:

determining, in response to the determination that the linked list of not-full filled blocks, whether there is an idle data block unit in the data area according to the block bitmap;

determining, in response to the determination that there is an idle data block unit in the data area, an idle data block unit with the forefront address in the data area as a minimum idle data block unit, and determining the minimum idle data block unit as the target data block unit; and determining, in response to the determination that there is no idle data block unit in the data area, that the target data block unit does not exist and exiting, or recycling a data block unit designated by a recycle instruction, and determining the designated data block unit as the target data block unit.

In a specific implementation of the present application, recycling a data block unit designated by a recycle instruction includes:

clearing the metadata block of the designated data block unit and updating status information corresponding to the designated data block unit stored in the block bitmap;

determining whether data information of data stored in the data block of the designated data block unit is stored in the linked list of not-full filled blocks; and in response to the determination that data information of the data stored in the data block of the designated data block unit is stored in the linked list of not-full filled blocks, deleting the data information from the linked list of not-full filled blocks.

In a specific implementation of the present application, storing data to be stored to the target data block unit includes:

determining whether the remaining space of the data block of the target data block unit is sufficient, according to the size of the data to be stored and the size of the target data stored in the data block of the target data block unit, if the remaining space is sufficient, dividing the data to be stored into a plurality of data segments, writing each of the data segments into the data block of the target data block unit successively, and writing data information of the data segments into the metadata block of the target data block unit.

According to another aspect of the application, an application program is provided, the application program is used to implement the block storage method based on a storage device when being executed.

According to another aspect of the application, a storage medium is provided, the storage medium is used to store an application program that is used to implement the block storage method based on a storage device when being executed.

Compared with the prior art, one or more embodiments of the above solutions may have the following advantages or beneficial effects:

With the storage device, metadata is stored in a distributed manner, wherein each of the metadata blocks and the data blocks are stored as a whole. The address offset of updating metadata after writing data is thus reduced, and the metadata update efficiency as well as the overall storage performance of the storage device are improved. In addition, with the metadata stored in this distributed manner, the probability of data unavailability due to continuous damage of a plurality of metadata blocks is greatly reduced, and the defect in the prior art that the intact data blocks cannot store data normally due to continuous damage of the metadata is overcome.

Additional features and advantages of the application will be set forth in the following description, and will in part become apparent therefrom, or may be understood by implementing the application. The purposes and other advantages of the application may be achieved and obtained based on the structure particularly set forth in the description and claims as well as the drawings.

BRIEF DESCRIPTION OF THE DRAWINGS

In order to describe the technical solutions of embodiments of the present application or of the prior art more clearly, a simple introduction of the drawings required in the description of the embodiments and of the prior art will be given. Obviously, the drawings described below are just for some embodiments of the present application and other drawings may be obtained by those of ordinary skills in the art based on these drawings without any creative effort.

DETAILED DESCRIPTION

To make the purposes, technical solutions, and advantages of the present application more comprehensible, a detailed description of the present application will be given below with reference to the drawings and embodiments. Obviously, the described embodiments are merely a part but not all of the embodiments of the present application. Based on the embodiments of the present application, all other embodiments obtained by those of ordinary skills in the art without any creative efforts are within the scope of this application.

The technical problems to be solved by the present application are: the offset between a metadata block and a data block is larger when using the block storage method for storage device in the prior art, and thus an increased seek time is required to update the metadata after data have been written into data blocks; in addition, the centralized storage of metadata may easily cause continuous damage to the metadata, as a result, intact data blocks cannot store data normally due to the damage of the metadata. In order to solve the above technical problems, the embodiments of the present application provide a storage device.

Before explaining each of the following embodiments in detail, the terms "block data storage", "block bitmap", "metadata" and "linked list of not-full filled blocks" are explained.

Block data storage: for the data characteristics of the monitoring of storage, underlying data blocks are used as basic storage units, and a dedicated data structure is used to monitor the storage. Through the combination of the data block and the dedicated data structure, a structural management of the monitoring of storage is achieved.

Block bitmap: it is used for managing storage blocks on a disk to ensure that a given block of the disk is used for one purpose at any moment. Storage may thus become easy and space can be saved by employing block bitmap to manage idle storage blocks. In order to create a bitmap for idle blocks, it is necessary to retain sufficient spaces that are contiguous on the disk in order to set a bit for each of blocks.

Metadata: it describes the structure and meaning of data and can be used to support functions such as indication of storage locations, historical data, resource searching, file recording, and so on.

Linked list of not-full filled blocks: it stores data information stored in metadata blocks of all the data block units that are not full in a data area. When writing data, the data are first written into data block units that are full, thereby avoiding waste of storage space due to too many data block units that are not full.

Figure 1:
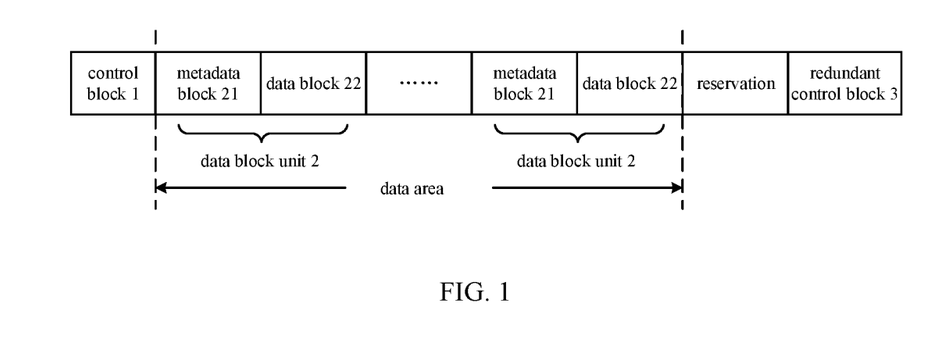
FIG. 1 shows a schematic view of a segmentation for the disk space of a storage device.

FIG. 1 shows a schematic view of a segmentation for the disk space of a storage device. As shown in FIG. 1, a data area is divided from the entire disk space of the storage device for centralized storage of pairs of metadata blocks 21 and data blocks 22, and a metadata block 21 and a data block 22 are stored adjacent to each other as a whole unit, which is herein referred to as a data block unit 2.

Specifically, the data area includes a plurality of end-to-end adjacent data block units 2. A data block unit 2 includes a metadata block 21 and a data block 22 adjacent to each other, and the head address of the metadata block 21 usually precedes the head address of the data block 22. The data block 22 is configured to store data. In the video monitoring field, the data involved in this embodiment are video data. The metadata block 21 is configured to store data information (here, also referred to as metadata) about the target data stored in the data block 22 of the data block unit 2 to which it belongs. In this embodiment, the data block 22 is configured to store a plurality of data segments arranged in sequence. All the data segments here constitute the above target data, wherein each data segment is a segment of the video data. Accordingly, in the metadata block 21, segment information corresponding to each of the data segments is stored in sequence according to the order of the data segments in the data block 22, and all the segment information constitutes the above data information. Generally, segment information corresponding to one data segment includes, but is not limited to, the block No. (i.e. the No. of the data block unit 2 in which the data segments are stored), front-end device No. (i.e. the No. of a video output device corresponding to the data segments), segment No. (i.e. the No. that the data segment is ranked in all data segments stored in the metadata block 21), offset within the block, segment length, data size of i-frame, and i-frame information.

In order to facilitate calculation of the head address of each metadata block 21 and each data block 22, the total capacity of each data block 22 is set to a first preset capacity, while the total capacity of each metadata block 21 is set to a second preset capacity.

With the storage device of this embodiment, metadata is stored in a distributed manner, wherein each metadata block 21 and each data block 22 are stored as a whole. The address offset of updating metadata after writing data is thus reduced, and the metadata update efficiency as well as the overall storage performance of the storage device are improved. In addition, with the metadata stored in this distributed manner, the probability of data unavailability due to continuous damage of a plurality of metadata blocks 21 is greatly reduced, and the defect in the prior art that the intact data blocks 22 cannot store data normally due to continuous damage of the metadata is overcome.

In a preferred embodiment, the disk space of the storage device further includes a control block 1, which stores information about the entire disk of the storage device. In order to facilitate calculation of the head addresses of each metadata block 21 and each data block 22 in the data area, the total capacity of the control block 1 may be set to a fixed value, for example, 1M, and in particular, the head address of the control block 1 may be set to the head address of the entire disk space of the storage device. In addition, the control block 1 may be adjacent to the first data block unit 2 in the data area.

Specifically, the control block 1 includes a control block header and a block bitmap. The head address of the control block header precedes the head address of the block bitmap. The control block header is configured to store information such as the number of data block units 2 in the data area, the first preset capacity, the second preset capacity, a label, a Cyclic Redundancy Check (CRC) value, and the like. The space occupied by the control block header is very small, and most of the space in the control block 1 is used to store the block bitmap. The block bitmap is configured to store status information of usage status of each of the data block units 2 in the data area, and each bit in the block bitmap corresponds to one data block unit 2 in the data area, indicating whether the data block unit 2 has been used. Generally, a binary number is used to indicate the usage status of the data block unit 2. If the status information recorded in the block bitmap corresponding to the data block unit 2 is 0, it means that the data block unit 2 has not been used, that is, neither the metadata block 21 nor the data block 22 of the data block unit 2 stores any data. Conversely, if the status information recorded in the block bitmap corresponding to the data block unit 2 is 1, it means that the data block unit 2 has been used, that is, both the metadata blocks 21 and the data block 22 of the data block unit 2 store data.

In this embodiment, the drawbacks regarding time-consuming search and inconvenient management caused by scattered storage of metadata are overcome by using a block bitmap to manage the data blocks 22. In addition, the integrity of the metadata does not completely depend on the management node located on the upper level of the storage device. When the metadata (the metadata stored in the management node) managed by the management node fails (for example, lost), it can be recovered from the storage device according to the block bitmap.

Further, the disk space of the storage device may further includes a redundant control block 3 as a redundant backup of the control block 1. In other words, the redundant control block 3 is a copy of the above control block 1, and the total capacity of the redundant control block 3 is the same as the total capacity of the control block 1, and both are preferably 1M. Similarly, the redundant control block 3 also includes a control block header and a block bitmap. The control block header is configured to store information such as the number of data block units 2 in the data area, the first preset capacity, the second preset capacity, a label, a CRC value, and the like. The block bitmap is configured to store status information of usage status of each of the data block units 2 in the data area, and each bit in the block bitmap corresponds to one data block unit 2 of the data area, indicating whether the data block unit 2 has been used.

The start address of the redundant control block 3 may not be able to be determined due to the failure of the control block 1, and then the redundant control block 3 cannot function as a redundancy since the key information of the disk cannot be read. In order to avoid such technical defects, in one preferred embodiment of the present application, the tail address of the redundant control block 3 is set to the tail address of the disk space, and space between the head address of the redundant control block 3 and the tail address of the data area is reserved space.

The following describes, with reference to FIG. 1, the process of determining the head address of each data storage area of the disk space of the storage device. Specifically, after the total capacity of the control block 1, the total capacity of the metadata block 21 and the total capacity of the data block 22 are set, if the address of each area is adjacent to each other end to end, the start and end addresses of all the areas are fixed. If, for example, the disk capacity of the storage device is set to a constant DEV_CAPACITY, the total capacity of the control block 1 is set to 1M, the total capacity of the redundant control block 3 is also set to 1M, the second preset capacity (i.e. the total capacity of the metadata block 21) is set to a constant INFO_BLK_SIZE and the first preset capacity (i.e. the total capacity of the data block 22) is set to DATA_BLK_SIZE, the number of data block units 2 in the data area can be determined by the following formula: (DEV_CAPACITY−1M*2)/(INFO_BLK_SIZE+DATA_BLK_SIZE). The start address of the control block 1 is 0. The start address of the n-th metadata block 21 is 1M+(n−1)*(INFO_BLK_SIZE+DATA_BLK_SIZE). Particularly, the redundant control block 3 is stored at the rearmost end of the disk space, that is, the tail address of the redundant control block 3 is set to the tail address of the disk space of the storage device. The start address of the redundant control block 3 is DEV_CAPACITY−1M. If the total capacity of the data area is not an integral multiple of the sum of the total capacity of the metadata blocks 21 and the total capacity of the data blocks 22, a piece of space is preserved between the data block 22 at the end of the data area and the redundant control block 3. Here, it should be noted that the advantage of arranging the redundant control block 3 at the rearmost end of the disk space over arranging it at the end of the adjacent data area is that: if the redundant control block 3 is adjacent to the last data block 22 in the data area, it is necessary to obtain the start address of the redundant control block 3 by calculating based on the first preset capacity and the second preset capacity, which are key information recorded in the control block 1. However, once the control block 1 fails, it will not be able to determine the start address of the redundant control block 3 and read the key information about the disk space, thus the redundant control block 3 cannot function as a redundancy. In the preferred embodiment described above, the redundant control block 3 is fixed at the rearmost end of the disk space with a constant start address, therefore, when the control block 1 fails, the system can still keep the storage device in normal operation based on the key information backed up in the redundant control block 3. The redundant control block 3 thus gives full play to the role of a redundant backup.

In one specific implementation of the present application, the storage device may further include:

a processor, communication interfaces and a bus and so on, wherein the processor, the memory and the communication interfaces are connected and communicate with each other via the bus.

Specifically, the above processor may be a Central Processing Unit (CPU), an Application Specific Integrated Circuit (ASIC), or one or more integrated circuits configured to implement the embodiments of the present application.

Figure 2:
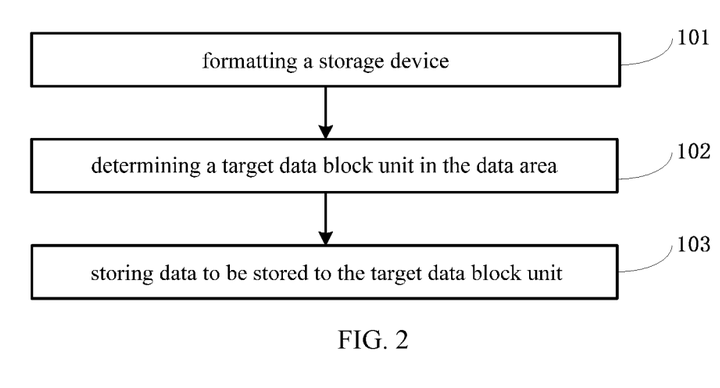
FIG. 2 shows a flow chart of a block storage method based on the above storage device.

The embodiment of the present application further provides a block storage method based on the above storage device. FIG. 2 is a flow chart of a block storage method based on the above storage device. The block storage method includes the following steps:

Step 101: formatting a storage device so that disk space of the storage device includes a data area having a plurality of end-to-end adjacent data block units 2, each of which includes a metadata block 21 and a data block 22 adjacent to each other; wherein the data block 22 with a first preset capacity is configured to store data, and the metadata block 21 with a second preset capacity is configured to store data information of the data.

Specifically, the storage device must be formatted in order to be used by the storage system. The formatting process of the storage device is as follows: dividing the disk space of the storage device according to the first preset capacity and the second preset capacity, then setting control block header information and zeroing out the block bitmap; and eventually copying data in control block 1 to redundant control block 3.

Those skilled in the art may understand that formatting of the storage device may be performed when the storage device is used for the first time, or otherwise be performed when needed, such as when a storage device fails, etc., and it is unnecessary to format the storage device before storing data each time.

Step 102: a target data block unit in the data area is determined.

Specifically, this step involves requesting and recycling a data block unit 2 to determine a suitable target data block unit in the data area for the data to be stored. The method for requesting a target data block unit and the method for recycling a designated data block unit will be described in detail with reference to FIG. 3 and FIG. 4, respectively.

Step 103: the data to be stored is stored into the target data block unit.

Specifically, if the remaining space of the data block 22 of the target data block unit is sufficient to store the data to be stored after the target data block unit has been determined, the data to be stored are stored to the target data block unit. The remaining space of the data block 22 can be obtained based on the total capacity of the data block 22 and the lengths of all the data segments stored in the data block 22. The process of storing the data to be stored will be explained in detail with reference to FIG. 5.

According to the block storage method of the storage device of this embodiment, metadata is stored in a distributed manner, wherein each metadata block 21 and each data block 22 are stored as a whole. The address offset of updating metadata after writing data is thus reduced, and the metadata update efficiency as well as the overall storage performance of the storage device are improved. In addition, with the metadata stored in this distributed manner, the probability of data unavailability due to continuous damage of a plurality of metadata blocks 21 is greatly reduced, and the defects in the prior art that the intact data blocks 22 cannot store data normally due to continuous damage of the metadata is overcome.

In one preferred embodiment, formatting storage device further makes the disk space of the storage device further include a control block 1 having a control block header and a block bitmap, and a redundant control block 3 configured to be a redundant backup of the control block 1; wherein the control block header is configured to store the number of the data block units 2 in the data area, the first preset capacity and the second preset capacity; the block bitmap is configured to store usage status of each of the data block units 2.

In this embodiment, the drawbacks regarding time-consuming search and inconvenient management caused by scattered storage of metadata are overcome by using a block bitmap to manage the data blocks 22. In addition, the integrity of the metadata does not completely depend on the management node located on the upper level of the storage device. When the metadata (the metadata stored in the management node) managed by the management node fails (for example, lost), it can be recovered from the storage device according to the block bitmap.

Figure 3:
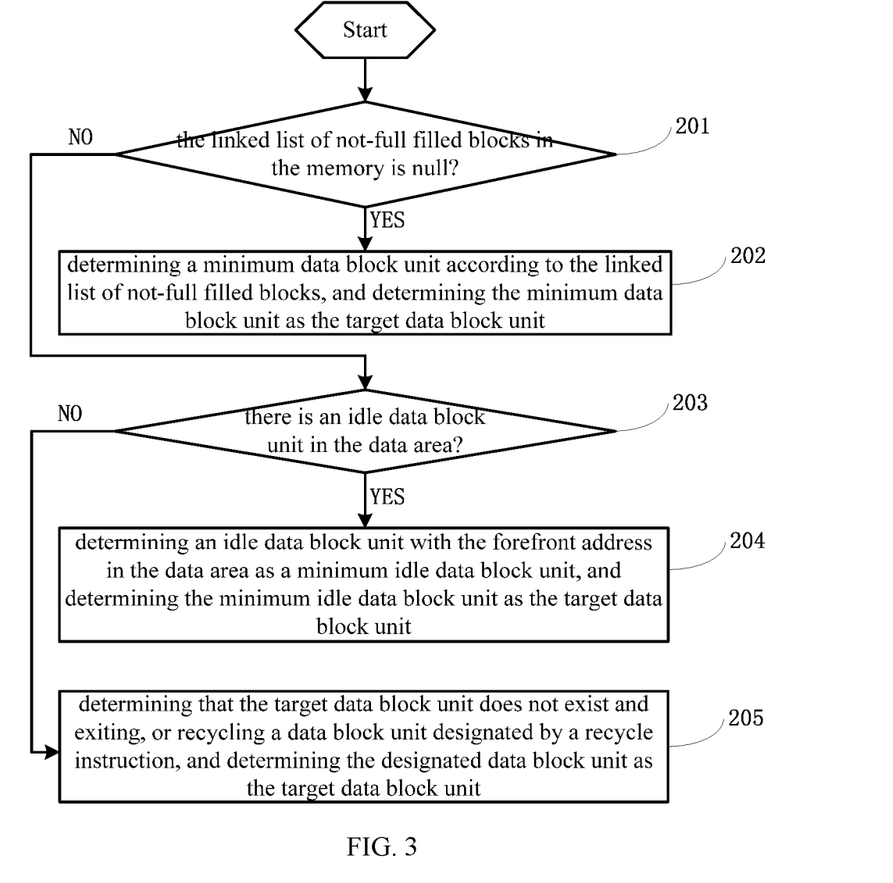
FIG. 3 shows a flow chart of a method for determining a target data block unit in a data area.

FIG. 3 shows a flow chart of a method for determining a target data block unit in a data area. As shown in FIG. 3, the method for determining a target data block unit in the data area includes:

Step 201: determining whether a linked list of not-full filled blocks in the memory is not null, wherein the linked list of not full blocks is configured to store data information stored in the metadata blocks 21 of all the data block units that are not full in the data area; wherein the size of data stored in the data block 22 of a not-full filled data block unit is smaller than the first preset capacity and the size of data information stored in the metadata block 21 of the not-full filled data block unit is smaller than the second preset capacity.

Specifically, when data from a video monitoring front-end device is about to be stored into the storage system, a suitable block is requested for the device first, that is, a target data block unit is requested. The requesting strategy for the data block unit 2 used herein is as follows: the data to be stored is preferentially written into a not-full filled data block unit with a forward-most location in the data area; if there is no data block unit that is not full in the data area, the data to be stored is written into an idle data block unit with a forward-most location in the data area; if there is no idle data block unit in the data area, the request is considered as failing and the step is exited, or a designated data block unit is recycled according to a recycle instruction sent by the storage system and the data to be stored is written into the designated data block unit.

The linked list of not-full filled blocks involved in this step is stored in the memory of the storage system and updated in real time as data are continuously written. The linked list of not-full filled blocks is configured to store data information stored in metadata blocks 21 of all the data block units that are not full in the data area. Generally, for a certain data block unit 2, if the remaining space of its metadata block 21 is insufficient (that is, less than the set minimum capacity) or the remaining space of its data block 22 is insufficient (that is, less than the set minimum capacity), the data block unit 2 is considered to be full. Conversely, if the remaining space of its metadata blocks 21 is sufficient and the remaining space of its data blocks 22 is sufficient, the data block unit 2 is considered to be not full.

Those skilled in the art may understand that in practical applications, in addition to the above-described linked list of not-full filled blocks, the block bitmap of the control block may also be stored in the memory. Specifically, a block bitmap of a control block of the storage device may be read into the memory when system initialization is being performed so that access time may be greatly reduced if there is a need to access the block bitmap subsequently.

Step 202: in response to the determination that the linked list of not-full filled blocks is not null, determining a minimum data block unit according to the linked list of not-full filled blocks, and determining the minimum data block unit as the target data block unit.

Specifically, when linked list of not-full filled blocks is not null, that is, there is a not-full filled data block unit that is not full in the data area, the smallest data block unit is determined based on the data information in the linked list of not-full filled blocks, and the minimum data block unit is determined as the target data block unit. Here, the minimum data block unit refers to a not-full filled data block unit with a forward-most location (i.e. with the smallest address) among all not-full filled data block units in the data area.

Step 203: in response to the determination that the linked list of not-full filled blocks is null, determining whether there is an idle data block unit in the data area according to the block bitmap; wherein the remaining space of the data block 22 of the idle block unit is equal to the first preset capacity and the remaining space of the metadata block 21 of the idle block unit is equal to the second preset capacity.

Step 204: in response to the determination that there is an idle data block unit in the data area, determining an idle data block unit with the forward-most location in the data area as a minimum idle data block unit, and determining the minimum idle data block unit as the target data block unit.

Specifically, when the linked list of not-full filled blocks is null, i.e., there is no data block unit that is not full in the data area, the data to be stored will be written into the minimum idle data block unit in the data area. As data are continuously written, the minimum idle data block unit changes. The method for obtaining the minimum idle data block unit is: reading the block bitmap of the control block 1 of the storage device into memory block bitmap initially during system initialization; searching the bitmap, from the first bit of the block bitmap until the last data block unit 2, to determine whether there is an unused data block unit 2; if an unused data block unit 2 is found, the data block unit 2 is recorded as the minimum idle data block unit, otherwise, the minimum idle data block unit is set to an invalid value. The minimum idle data block unit is recorded in the memory of the storage system. The minimum idle data block unit is determined to be a target block unit, that is, the status information corresponding to the data block unit 2 in the block bitmap is marked as used, the memory block bitmap is updated and the updated memory block bitmap is rewritten to the block bitmap of the control block 1, and the data information (including the front-end device No.) corresponding to the minimum idle data block unit is recorded in the linked list of not-full filled blocks. After the minimum idle data block is filled with data, its corresponding data information is deleted from the linked list of not-full filled blocks. In addition, once the minimum idle data block unit is determined as a target data block unit, the search will be proceeded to determine a new minimum idle data block unit. If no unused block unit 2 is found during the search from the current block unit 2 to the last block unit 2, the search will be started from the beginning; if an unused data block unit 2 is found, the data block unit 2 is recorded as the minimum idle data block unit, and if still no unused data block unit 2 is found, the minimum idle data block unit is set to an invalid value. In this way, on the one hand, the waste of storage space due to too many data block units that are not full is avoid, on the other hand, the data are written as orderly as possible and the write performance is improved.

Step 205: in response to the determination that there is no idle data block unit in the data area, determining that the target data block unit does not exist and exiting the step, or recycling a designated data block unit involved in a recycle instruction, and determining the recycled designated data block unit as the target data block unit.

Specifically, if neither a not-full filled data block unit nor an idle data block unit exists in the data area, it is determined that a target data block unit does not exist and the step is exited, and another storage device is needed to keep the writing in progress. Alternatively, a data block unit 2 in which outdated data is stored is recycled according to a recycling instruction of the storage system to ensure that the storage of the data to be stored can be continued, avoid the occupancy of the storage space by outdated data, and improve the practicability of the storage device. It should be noted that the storage system can issue a recycling instruction to recycle one or more designated data block unit when storage space in the storage device is insufficient, or issue a recycling instruction at any time to recycle one or more designated data block unit in the data area. Here, the recycle of the designated data block unit involves: clearing the metadata block 21 of the designated data block unit, setting the status information corresponding to the designated data block unit described in the block bitmap to zero, and if the designated data block unit is a not-full filled data block unit, deleting the data information corresponding to the designated data block unit from the linked list of not blocks. It should be noted that the recycling process may not involve the clearing the data block 22 of the designated data block unit, this is because once the metadata block 21 of the designated data block unit is cleared, the data stored in the data block 22 can be overwritten by the subsequently written data.

Figure 4:
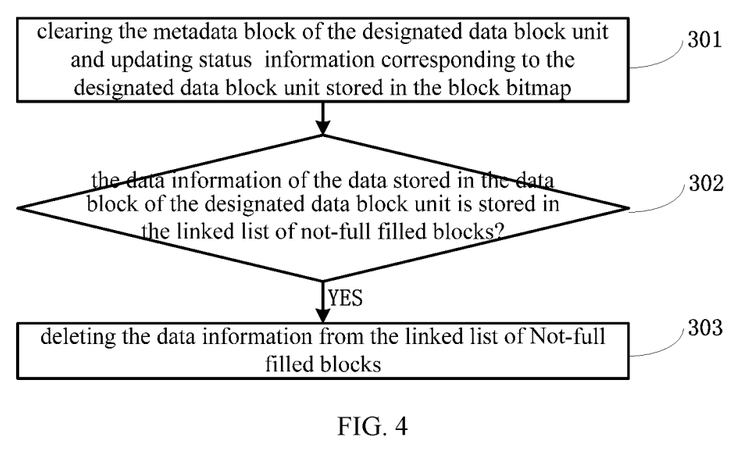
FIG. 4 shows a flow chart of a method for recycling a designated data block unit involved in a recycle instruction.

FIG. 4 shows a flow chart of a method for recycling a data block unit designated by a recycle instruction. As shown in FIG. 4, recycling the data block unit designated by a recycle instruction includes the following steps:

Step 301: clearing the metadata block 21 of the designated data block unit and updating the status information corresponding to the designated data block unit stored in the block bitmap.

Step 302: determining whether data information of data stored in the data block 22 of the designated data block unit is stored in the linked list of not-full filled blocks.

Step 303: in response to the determination that data information of the data stored in the data block 22 of the designated data block unit is stored in the linked list of not-full filled blocks, deleting the data information from the linked list of not-full filled blocks.

Specifically, the head address of metadata of a designated data block unit is calculated first according to the block No. of the designated data block unit, and the metadata block 21 is cleared. Then the corresponding status information in the memory block bitmap is set to be unused and the control block 1 is updated with the memory block bitmap. Finally, when it is determined that the designated data block unit is a not-full filled data block unit, data information corresponding to the designated data block unit is deleted from the linked list of not-full filled blocks.

After a suitable target block unit is found, the video data are written into the block in segments. A piece of segment information is generated based on each of data segments and is written into the metadata block 21 corresponding to the data block unit 2. Because the number of i-frames contained in different data segments may be different, the lengths of the information in the data segments may also be different.

Figure 5:
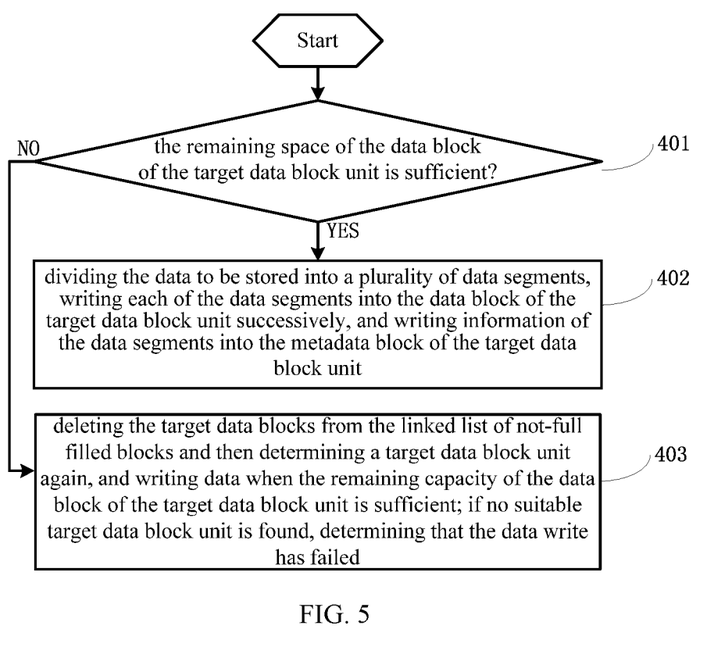
FIG. 5 shows a flow chart of a method for storing data to be stored to a target data block unit.

FIG. 5 shows a flow chart of a method for storing data to be stored in a target data block unit. As shown in FIG. 5, the method for storing data to be stored to a target data block unit includes the following steps:

Step 401: determining whether the remaining space of a data block 22 of the target data block unit is sufficient, according to the size of the data to be stored and the size of the target data stored in the data block 22 of the target data block unit.

Step 402: if the remaining space of the data block 22 of the target data block unit is sufficient, dividing the data to be stored into a plurality of data segments, writing each of the data segments into the data block 22 of the target data block unit successively, and writing data information of the data segments into the metadata block 21 of the target data block unit.

Specifically, when the remaining space of the data block 22 of the target data block unit is sufficient, the start offset of the metadata block 21 is determined according to the block No. of the data block unit 2. The metadata block 21 is read into the memory to obtain the used space of the data block 22 of the data block unit 2. The start address for the data to be stored is calculated based on the used space of the data block 22 and written into the memory. A piece of segment information is filled into the metadata block 21 recorded in the memory. The metadata block 21 in the memory is then rewritten to the metadata block 21 corresponding to the block of the storage device and freed.

Step 403: if the remaining space of the data block 22 of the target data block unit is insufficient, deleting the target data block 22 from the linked list of not-full filled blocks. A target data block unit is then determined again. Step 401 is performed to determine whether the remaining space of the data block 22 of the determined target data block unit is sufficient, and if so, step 402 is performed to write data. If no suitable target data block unit is found, a write failure is determined.

An embodiment of the present application further provides another block storage method based on the above storage device. The method includes:

receiving a data storage instruction for data to be stored;

determining a target data block unit in a data area of the storage device, wherein the storage device has been formatted, and the disk space of the storage device includes a data area having a plurality of end-to-end adjacent data block units, each of which includes a metadata block and a data block adjacent to each other; wherein the data blocks with a first preset capacity is configured to store target data, and the metadata block with a second preset capacity is configured to store data information of the target data;

storing the data to be stored to the target data block unit.

When determining a target data block unit in the data area of the storage device, it involves requesting and recycling a data block unit 2 to determine a suitable target data block unit for storage of the data to be stored in the data area. Specifically, the method for requesting a target data block unit and the method for recycling a designated data block unit may be the same as the methods provided in the embodiments shown in FIG. 3 and FIG. 4, the details of which are thus omitted here.

In addition, when the data to be stored is stored to the target data block unit, the specific data storage process may be the same as that of the method provided in the embodiment shown in FIG. 5, the details of which are thus omitted here.

Those skilled in the art may understand that the above-described formatting of the storage device may be performed when the storage device is used for the first time, or otherwise be performed when needed, such as when a storage device fails, etc., and it is unnecessary to format the storage device before storing data each time.

An embodiment of the present application provides an application program that is used to implement the block storage method based on the storage device when being executed, and the block storage method based on the storage device includes:

receiving a data storage instruction for data to be stored;

determining a target data block unit in a data area of the storage device, wherein the storage device has been formatted, and the disk space of the storage device includes a data area having a plurality of end-to-end adjacent data block units, each of which includes a metadata block and a data block adjacent to each other; wherein the data blocks with a first preset capacity is configured to store target data, and the metadata blocks with a second preset capacity is configured to store data information of the target data;

storing the data to be stored to the target data block unit.

In a specific implementation of the present application, the block storage method implemented when the application program described above being executed may include:

formatting a storage device so that the disk space of the formatted storage device includes a data area having a plurality of end-to-end adjacent data block units, each of which includes a metadata block and a data block adjacent to each other; wherein the data block with a first preset capacity is configured to store target data, and the metadata blocks with a second preset capacity is configured to store data information of the target data;

determining a target data block unit in the data area;

storing data to be stored to the target data block unit.

In a specific implementation of the present application, in the block storage method implemented when the application program described above being executed, formatting the storage device further makes the disk space of the formatted storage device to include a control block having a control block header, a block bitmap and a redundant control block configured to be a redundant backup of the control block; wherein the control block header is configured to store the number of the data block units, the first preset capacity and the second preset capacity; the block bitmap is configured to store status information of usage status of each data block unit.

In a specific implementation of the present application, in the block storage method implemented when the application program described above being executed, the method for determining a target data block unit in the data area includes:

determining whether a linked list of not-full filled blocks in the memory is not null;

in response to the determination that the linked list of not-full filled blocks is not null, determining a minimum data block unit according to the linked list of not-full filled blocks, and determining the minimum data block unit as the target data block unit.

In a specific implementation of the present application, in the block storage method implemented when the application program described above being executed, the method for determining a target data block unit in the data area further includes:

determining, in response to the determination that the linked list of not-full filled blocks is null, whether there is an idle data block unit in the data area according to the block bitmap;

determining, in response to the determination that there is an idle data block unit in the data area, an idle data block unit with the forefront address in the data area as a minimum idle data block unit, and determining the minimum idle data block unit as the target data block unit;

determining, in response to the determination that there is no idle data block unit in the data area, that the target data block unit does not exist and exiting, or recycling a the data block unit designated by a recycle instruction, and determining the recycled designated data block unit as the target data block unit.

In a specific implementation of the present application, in the block storage method implemented when the application program described above being executed, recycling the data block unit designated by the recycle instruction includes:

clearing the metadata block of the designated data block unit and updating status information corresponding to the designated data block unit stored in the block bitmap;

determining whether data information of data stored in the data block of the designated data block unit is stored in the linked list of not-full filled blocks; and in response to the determination that data information of the data stored in the data block of the designated data block unit is stored in the linked list of not-full filled blocks, deleting the data information from the linked list of not-full filled blocks.

In a specific implementation of the present application, in the block storage method implemented when the application program described above being executed, storing data to be stored to the target data block unit includes:

determining whether the remaining space of the data block of the target data block unit is sufficient, according to the size of the data to be stored and the size of the target data stored in the data block of the target data block unit, if the remaining space is sufficient, dividing the data to be stored into a plurality of data segments, writing each of the data segments into a data block of the target data block unit successively, and writing data information of the data segments into the metadata block of the target data block unit.

An embodiment of the present application provides a storage medium for storing an application program that is used to implement the block storage method based on a storage device when being executed, and the block storage method based on a storage device includes:

receiving a data storage instruction for data to be stored;

determining a target data block unit in a data area of the storage device, wherein the storage device has been formatted, and the disk space of the formatted storage device includes a data area having a plurality of end-to-end adjacent data block units, each of which includes a metadata block and a data block adjacent to each other; wherein the data blocks with a first preset capacity is configured to store target data, and the metadata block with a second preset capacity is configured to store data information of the target data;

storing the data to be stored to the target data block unit.

In a specific implementation of the present application, the block storage method implemented when the application program stored in the storage medium described above being executed may include:

formatting the storage device so that disk space of the storage device includes a data area having a plurality of end-to-end adjacent data block units each of which includes a metadata block and a data block adjacent to each other; wherein the data block with a first preset capacity is configured to store target data, and the metadata block with a second preset capacity is configured to store data information of the target data;

determining a target data block unit in the data area;

storing data to be stored to the target data block unit.

In a specific implementation of the present application, in the block storage method implement by an application program stored in the storage medium described above, formatting the storage device further enables the disk space of the formatted storage device to include a control block having a control block header, a block bitmap, and a redundant control block configured to be a redundant backup of the control block; wherein the control block header is configured to store the number of the data block units, the first preset capacity and the second preset capacity; the block bitmap is configured to store status information of usage status of each data block unit.

In a specific implementation of the present application, in the block storage method implemented by an application program stored in the storage medium described above, the method for determining a target data block unit in the data area includes:

determining whether a linked list of not-full filled blocks in the memory is not null;

determining, in response to the determination that the linked list of not-full filled blocks is not null, a minimum data block unit according to the linked list of not-full filled blocks, and determining the minimum data block unit as the target data block unit.

In a specific implementation of the present application, in the block storage method implemented by an application program stored in the storage medium described above, the method for determining a target data block unit in the data area includes:

determining, in response to the determination that the linked list of not-full filled blocks is null, whether there is an idle data block unit in the data area according to the block bitmap;

determining, in response to the determination that there is an idle data block unit in the data area, an idle data block unit with the forefront address in the data area as a minimum idle data block unit, and determining the minimum idle data block unit as the target data block unit;

determining, in response to the determination that there is no idle data block unit in the data area, that the target data block unit does not exist and exiting, or recycling a data block unit designated by a recycle instruction, and determining the designated data block unit as the target data block unit.

In a specific implementation of the present application, in the block storage method implemented by an application program stored in the storage medium described above, recycling a data block unit designated by the recycle instruction includes:

clearing the metadata block of the designated data block unit and updating status information corresponding to the designated data block unit stored in the block bitmap;

determining whether data information of data stored in the data block of the designated data block unit is stored in the linked list of not-full filled blocks;

in response to the determination that data information of the data stored in the data block of the designated data block unit is stored in the linked list of not-full filled blocks, deleting the data information from the linked list of not-full filled blocks.

In a specific implementation of the present application, in the block storage method implemented by an application program stored in the storage medium described above, storing data to be stored to the target data block unit includes:

determining whether the remaining space of the data block of the target data block unit is sufficient, according to the size of the data to be stored and the size of the target data stored in the data block of the target data block unit, if the remaining space is sufficient, dividing the data to be stored into a plurality of data segments, writing each of the data segments into a data block of the target data block unit successively, and writing data information of the data segments into the metadata blocks of the target data block unit.

For embodiments of the application program and the storage medium, the description is relatively simple because they are basically similar to the embodiments of the method. For relevant parts, reference may be made to the description of the method embodiments.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the terms "comprise(s) a . . . " or "include(s) a . . . " do not exclude that there are other identical elements in the processes, methods, articles, or devices which comprise these elements.

It will be understood by those of ordinary skills in the art that all or some of the steps in the method described above may be accomplished by a program to instruct the associated hardware. Said program may be stored in a computer-readable storage medium, such as ROM/RAM, a magnetic disk, an optical disk, etc.

Although the embodiments disclosed in the present application are as described above, the content described above is only used to facilitate understanding of the present application and is not intended to limit the present application. Any one skilled in the art can make changes and modifications in forms and details of the implementation without departing from the spirit and scope of the disclosure. However, the protection scope of the present application needs to be determined by the scope of the appended claims.

What is claimed is:

1. A storage device, wherein disk space of the storage device comprises a data area having a plurality of end-to-end adjacent data block units, each of which comprises a metadata block and a data block adjacent to each other;

wherein the data block with a first preset capacity is configured to store target data, and the metadata block with a second preset capacity is configured to store data information of the target data;

the disk space of the storage device further comprises a control block having a control block header and a block bitmap; wherein the control block header is configured to store the number of the data block units, the first preset capacity and the second preset capacity, and the block bitmap is configured to store status information of usage status of each block unit;

the disk space of the storage device further comprises a redundant control block configured to be a redundant backup of the control block; and the tail address of the redundant control block is the same to that of the disk space.

2. The storage device of claim 1 wherein, the head address of the control block is the same to that of the disk space, and the control block is adjacent to the first data block unit in the data area.

3. A block storage method based on a storage device, comprising:
receiving a data storage instruction for data to be stored;
determining a target data block unit in a data area of the formatted storage device, wherein the storage device has been formatted, and the disk space of the formatted storage device comprises a data area having a plurality of end-to-end adjacent data block units, each of which comprises a metadata block and a data block adjacent to each other; wherein the data block with a first preset capacity is configured to store target data, and the metadata block with a second preset capacity is configured to store data information of the target data; the disk space of the storage device further comprises a control block having a control block header and a block bitmap; wherein the control block header is configured to store the number of the data block units, the first preset capacity and the second preset capacity, and the block bitmap is configured to store status information of usage status of each block unit; the disk space of the storage device further comprises a redundant control block configured to be a redundant backup of the control block; and the tail address of the redundant control block is the same to that of the disk space and storing the data to be stored into the target data block unit.

4. A block storage method based on a storage device, comprising:
formatting the storage device so that disk space of the formatted storage device comprises a data area having a plurality of end-to-end adjacent data block units, each of which comprises a metadata block and a data block adjacent to each other; wherein, the data block with a first preset capacity is configured to store target data, and the metadata block with a second preset capacity is configured to store data information of the target data; the disk space of the storage device further comprises a control block having a control block header and a block bitmap; wherein the control block header is configured to store the number of the data block units, the first preset capacity and the second preset capacity, and the block bitmap is configured to store status information of usage status of each block unit; the disk space of the storage device further comprises a redundant control block configured to be a redundant backup of the control block; and the tail address of the redundant control block is the same to that of the disk space;
determining a target data block unit in the data area; and
storing data to be stored into the target data block unit.

5. The method of claim 4, wherein, formatting the storage device further makes the disk space of the formatted storage device comprise a control block having a control block header, a block bitmap, and a redundant control block configured to be a redundant backup of the control block; wherein the control block header is configured to store the number of the data block units, the first preset capacity and the second preset capacity, and the block bitmap is configured to store status information of usage status of each data block unit.

6. The method of claim 5, wherein, determining a target data block unit in the data area comprises:
determining whether a linked list of not-full filled blocks in the memory is not null;
determining, in response to the determination that the linked list of not-full filled blocks is not null, a minimum data block unit according to the linked list of not-full filled blocks; and
determining the minimum data block unit as the target data block unit.

7. The method of claim 6, wherein, determining a target data block unit in the data area further comprises:
determining, in response to the determination that the linked list of not-full filled blocks is null, whether there is an idle data block unit in the data area according to the block bitmap;
determining, in response to the determination that there is an idle data block unit in the data area, an idle data block unit with the forefront address in the data area as a minimum idle data block unit, and determining the minimum idle data block unit as the target data block unit; and
determining, in response to the determination that there is no idle data block unit in the data area, that the target data block unit does not exist and exiting, or recycling the data block unit designated by a recycle instruction, and determining the designated data block unit as the target data block unit.

8. The method of claim 7, wherein, recycling the data block unit designated by a recycle instruction comprises:
clearing the metadata block of the designated data block unit and updating status information corresponding to the designated data block unit stored in the block bitmap;
determining whether data information of data stored in the data block of the designated data block unit is stored in the linked list of not-full filled blocks; and
in response to the determination that data information of the data stored in the data block of the designated data block unit is stored in the linked list of not-full filled blocks, deleting the data information from the linked list of not-full filled blocks.

9. The method of claim 4, wherein, storing the data to be stored into the target data block unit comprises:
determining whether the remaining space of the data block of the target data block unit is sufficient according to the size of the data to be stored and the size of the target data stored in the data block of the target data block unit,
if the remaining space is sufficient, dividing the data to be stored into a plurality of data segments, writing each of the data segments into the data block of the target data block unit successively, and writing data information of the data segments into the metadata block of the target data block unit.

* * * * *